June 23, 1964 L. PÉRAS 3,138,438
METHODS FOR CONVERTING METHANE
Filed May 25, 1961
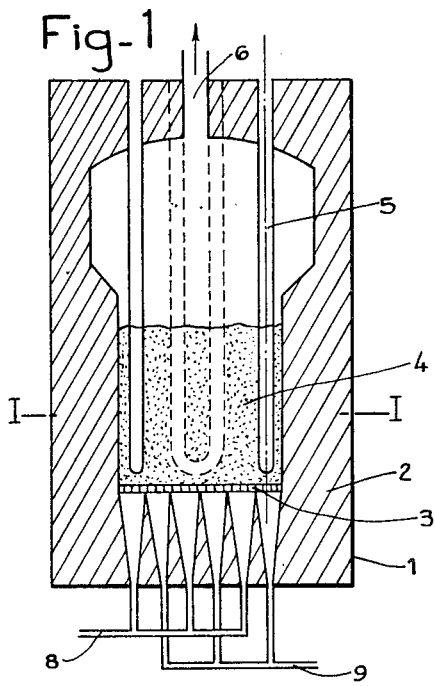
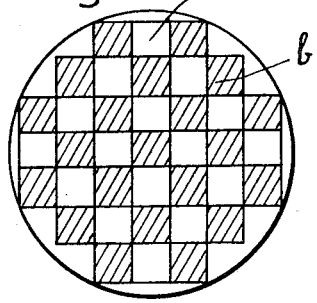
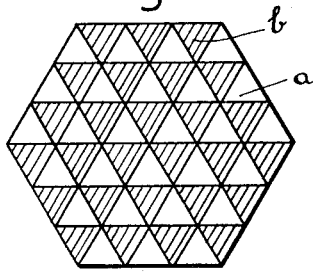
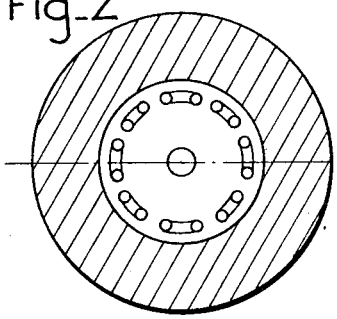
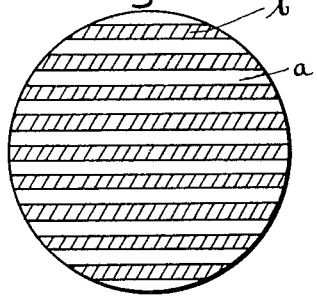
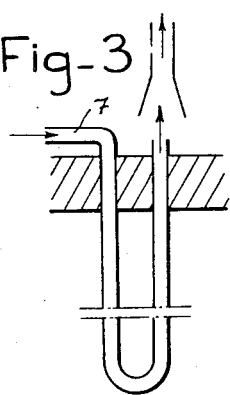
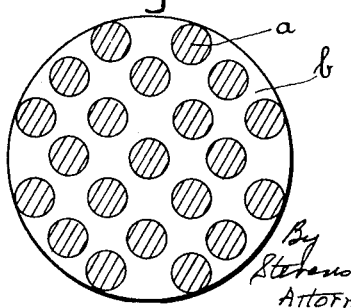
Inventor
Lucien Péras 3,138,438
METHODS FOR CONVERTING METHANE
Lucien Péras, Billancourt, France, assignor to Regie Nationale des Usines Renault, Billancourt, Seine, France
Filed May 25, 1961, Ser. No. 112,613
Claims priority, application France June 1, 1960
3 Claims. (Cl. 48—196)

It has been known for a long time to prepare a mixture of carbon monoxide CO and hydrogen $H_2$ by converting methane $CH_4$ or high-methane natural gas, by utilizing the reactions of oxygen $O_2$ or water steam or hydrogen oxide $H_2O$ with methane:

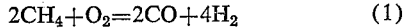

$$2CH_4 + O_2 = 2CO + 4H_2 \quad (1)$$

and

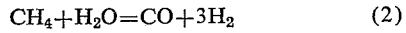

$$CH_4 + H_2O = CO + 3H_2 \quad (2)$$

which are attended by side equilibria and reactions yielding carbon dioxide gas, water steam, carbon and residual methane. It is also customary to resort not to pure oxygen but preferably to air or oxygen-enriched air when it is contemplated to use the gas for synthesizing ammonia; on the other hand, when it is desired to use the gas for effecting the gaseous reduction of iron ore, in the so-called closed-circuit process, any trace of nitrogen should carefully be avoided, for it would accumulate, and therefore only nitrogen-free oxygen should be used.

It is further known that the above Reaction 2 is strongly endothermic; therefore, it is rather difficult to maintain the reaction in large-sized, mass-producing industrial apparatus; it has thus been proposed to use in conjunction the above Reactions 1 and 2—the former having a pronounced exothermic character—in order to provide a suitable heat balance. However, in this case the chief drawback is the high cost of oxygen.

According to the present invention, the two reactions are also juxtaposed but in such unusual proportions that as a whole the operation is attended by a considerable heat absorption, these reactions taking place in a catalytic fluidized medium utilizing nickel as a catalyst, with a preliminary heating of the reaction gaseous mixtures in close vicinity of the reaction temperatures between 1,290° and 1,650° F. and continuous addition of heat energy to the reactor which on the other hand is strongly heat-insulated, this energy including the reaction heat, said reactor being on the other hand designed with a view to prevent the methane from producing with the oxygen a primary reaction attended by a local and noxious temperature increase.

According to an important feature of this invention, the catalyst bed or layer to be fluidized is supported by a porous hearth or base-plate of which the pore size is small enough to support the pulverulent catalyst even when not operating. It may advantageously consist of sintered stainless steel or sintered nickel-chromium alloy. Moreover, it is divided in its horizontal plane into a large number of small elementary sections constituting two groups or equivalences $a$ an $b$. One of these groups, for example $a$, is fed with the methane and water steam mixture, and the other $b$ is fed with the oxygen and water steam mixture.

With the foregoing and other objects in view, the invention resides in the novel arrangement and combination of parts and in the details of construction and operative steps hereinafter described and claimed, it being understood that changes in the precise embodiments of the invention herein disclosed may be made within the scope of what is claimed without departing from the spirit and of the invention.

Other objects and advantages will become apparent from the following description taken in conjunction with the accompanying drawing in which:

FIGURE 1 is an elevational section of a reactor constructed according to the teachings of this invention;

FIGURE 2 is a horizontal section taken upon the line I—I of FIG. 1;

FIGURE 3 is a detail view showing a reheater element of the reactor;

FIGURES 4, 5, 6, 7 are diagrammatic illustrations of base-plate structures divided into elementary sections.

To carry out the method of this invention, a reactor device preferably of the type described in one of my United States patent applications, Ser. No. 99,256 or Ser. No. 99,257, both filed March 29, 1961, is used, this reactor comprising a heat-insulated casing a base-plate receiving the fluidized bed or layer, as well as adequate reheater means.

According to a first embodiment described in application Ser. No. 99,257 entitled "Gas Reactors and Reheaters for the Direct Reduction of Ferrous Oxide by Hydrogen," the heating is effected through refractory metal tubes solid with the upper portion of the reactor frame structure and depending vertically in the form of a U through the fluidized bed down to a short distance from the porous base-plate. At any one of the two ends of the U-shaped tube a burner operating with air and hydrocarbon is mounted, the flame being directed inwards so that the smoke circulates through the U-shaped tube and escapes from the opposite end.

According to another embodiment of the same patent application the heating is effected through refractory metal tubes solid with the upper portion of the reactor frame structure and depending vertically therefrom. These refractory tubes are closed at their lower ends, and each tube has mounted therein an electrical heating resistor positioned preferably within the vertical dimensions of the fluidized bed.

According to the arrangement contemplated in the other patent application Ser. No. 99,256 of March 29, 1961, entitled "Reactor and Heater Devices for the Direct Reduction of Ferrous Oxide by Means of Hydrogen," the reactor is heated throughout the height of said fluidized bed by means of a ring of refractory alloy in direct contact with the fluidized bed and therefore located within the heat-insulated refractory wall and induction-heated by means of an induction winding disposed externally of the heat-insulated refractory wall.

FIGURES 1 and 2 of the drawing illustrate by way of example a cylindrical reactor consisting of a heat-insulated casing 1 provided with a heatproof refractory brick wall 2 having mounted in its inner space a porous base-plate 3 underlying the fluidized catalytic bed or layer 4 wherein the gas mixing and the aggregate reactions take place in conjunction. This assembly is kept at the proper temperature by refractory heating tubes 5 suspended from the upper portion of the reactor. The reacted gas escapes through the central duct 6.

FIG. 3, which is a section taken along the axis of a U-shaped tube depending from the upper portion of the frame structure of the reactor, shows the gas and air burner 7.

As already explained and according to a specific feature of this invention, the base-plate or hearth 3 is divided into alternated elementary fractions or sections $a$ and $b$, the elements of the first group $a$ being fed with the methane and water steam mixture through a manifold 8, and the elements of the second group $b$ are fed with an oxygen and water vapour mixture through another manifold 9.

FIGS. 4, 5, 6 and 7 illustrate different forms of embodiment of a base-plate or hearth constructed according to this invention.

In one of these typical embodiments each elementary section of polyhedral configuration is surrounded along its outer periphery only by elementary sections pertaining to the other group which have the same shape, so that only a punctual contact through a common vertex of the polyhedrons can be had between the two elementary sections of a same group.

To this end:

(1) The elementary sections may consist of squares of the same dimensions assembled alternatively in check pattern (see FIG. 4).

(2) The elementary sections may consist of equilateral triangles grouped to form a hexagonal assembly (see FIG. 5).

(3) The elementary sections may consist of narrow strips having parallel edges (see FIG. 6).

According to a further embodiment, one of the gaseous mixtures flows through elementary sections and constitutes the $a$ group, whereas the other group constitutes the remaining continuous surface $b$. In this case, the surfaces $a$ may be circular and disposed in alternate rows, for example as shown in FIG. 7.

In either forms of embodiment the methane and oxygen mixture (both components being diluted with water steam) is formed from a very large starting line on the surface of the porous base-plate and continues very gradually upwards through the fluidized bed; it is completed well before the gas issues from the catalytic bed.

Due to the mass of nickel catalyst, to heat capacity, its considerable heat-transfer surface, its mobility, the local oxidation and reduction reactions by which it produces and occurring alternately and very rapidly for each particle separately, the mixing and the reaction take place without any local overheating, no release of free carbon, without causing the complete combustion of the methane to proceed in an appreciable manner the equilibrium reactions leading to the carbon monoxide and hydrogen mixture.

The advantages and novel results obtained with the method of this invention may be summarized as follows:

I. The reaction utilizes a stronger quantity of water and a considerably smaller quantity of oxygen than any conventional methods, thus ensuring a substantial saving in raw materials.

II. In the use of gas for the direct reduction of iron ore the resulting gas is practically free of nitrogen, so that the ore reduction may take place under closed-circuit conditions while eliminating the water and carbon dioxide gas, without any risk of accumulating nitrogen.

III. The gas obtained directly through the conversion of methane has a higher hydrogen content and a lower carbon content than that obtaining with conventional methods.

IV. The large excess of residual water steam is not noxious if the carbon monoxide is subsequently converted according to the reaction:

$$CO+H_2O=CO_2+H_2$$

which may take place at a lower temperature and in a fluidized bed or layer.

V. The operation is completely free of methane cracking and therefore of carbon deposits. The residual gas has a minimum methane content consistent with chemical equilibria.

VI. The apparatus is extremely sturdy and provides large outputs.

VII. Economy in cost is ensured automatically.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. In the preparation of carbon monoxide-hydrogen mixtures by the reaction of methane with oxygen and steam in the presence of a fluidized bed of a nickel catalyst, mixing on one hand the methane with a part of the steam and on the other hand the oxygen with the remainder of the steam, separately preheating both of the resulting mixtures to a temperature within the range 1290° F. to 1650° F., introducing separately both of said mixtures into the fluidized bed of the catalyst and bringing them into contact within the fluidized bed of the catalyst whereby the methane reacts with said steam and oxygen to produce a carbon monoxide-hydrogen mixture.

2. In the preparation of carbon monoxide-hydrogen mixtures by the reaction of methane endothermically with oxygen and steam in the presence of a nickel catalyst, controlling the temperature of the reaction and preventing local overheating by mixing the methane with a part of the steam and the oxygen with the remainder of the steam, separately preheating the resulting mixtures to a temperature within the range 1290° to 1650° F., introducing into a zone of a fluidized bed of the nickel catalyst, respectively, the preheated methane-steam mixture in the form of a plurality of separate streams and, in the same zone of said fluidized bed, the preheated oxygen-steam mixture likewise in the form of a plurality of separate streams, in such a manner that in said zone the latter streams will surround the former streams so that the mixing of both of said streams will occur within said fluidized bed.

3. The method of claim 1 wherein the ratio of steam to oxygen is sufficiently high that the overall reaction between the methane, oxygen and steam is substantially endothermic.

References Cited in the file of this patent

UNITED STATES PATENTS

| 1,942,817 | Jaeger | Jan. 9, 1934 |
|---|---|---|
| 1,951,774 | Russell et al. | Mar. 20, 1934 |
| 2,051,363 | Beekley | Aug. 18, 1936 |
| 2,056,911 | Schiller et al. | Oct. 6, 1936 |
| 2,379,734 | Martin | July 3, 1945 |
| 2,523,284 | Eastman | Sept. 26, 1950 |
| 2,612,437 | Kaulakis et al. | Sept. 30, 1952 |
| 2,734,074 | Redman | Feb. 7, 1956 |
| 2,781,248 | Gorin | Feb. 12, 1957 |
| 2,931,711 | Walker | Apr. 5, 1960 |
| 2,990,260 | Mungen | June 27, 1961 |

FOREIGN PATENTS

| 502,710 | Canada | May 18, 1950 |
|---|---|---|
| 349,471 | Great Britain | May 26, 1931 |